(12) United States Patent
Watson

(10) Patent No.: US 11,063,954 B2
(45) Date of Patent: Jul. 13, 2021

(54) NETWORKING METHODS AND SYSTEMS FOR TRANSPORTATION VEHICLE ENTERTAINMENT SYSTEMS

(71) Applicant: Panasonic Avionics Corporation, Lake Forest, CA (US)

(72) Inventor: Philip Watson, Lake Forest, CA (US)

(73) Assignee: Panasonic Avionics Corporation, Lake Forest, CA (US)

( * ) Notice: Subject to any disclaimer, the term of this patent is extended or adjusted under 35 U.S.C. 154(b) by 273 days.

(21) Appl. No.: 16/246,141

(22) Filed: Jan. 11, 2019

(65) Prior Publication Data
US 2020/0228535 A1 Jul. 16, 2020

(51) Int. Cl.
*H04L 29/06* (2006.01)
*B64D 11/00* (2006.01)

(52) U.S. Cl.
CPC ...... *H04L 63/102* (2013.01); *B64D 11/00155* (2014.12); *H04L 63/0227* (2013.01); *H04L 63/0236* (2013.01); *H04L 63/0254* (2013.01); *H04L 63/08* (2013.01); *H04L 63/168* (2013.01)

(58) Field of Classification Search
CPC ............... H04L 63/0227; H04L 63/102; H04L 63/0254; H04L 63/168; H04L 63/08; H04L 63/0236; B64D 11/00155
See application file for complete search history.

(56) References Cited

U.S. PATENT DOCUMENTS

| | | | |
|---|---|---|---|
| 7,808,891 B2 | 10/2010 | Law | |
| 2004/0123150 A1* | 6/2004 | Wright | H04L 63/107 726/1 |
| 2007/0127460 A1 | 6/2007 | Wilber et al. | |
| 2009/0034540 A1* | 2/2009 | Law | H04N 21/6402 370/400 |
| 2013/0304796 A1* | 11/2013 | Jackowski | H04L 65/80 709/202 |
| 2015/0149611 A1* | 5/2015 | Lissack | H04L 43/16 709/224 |
| 2017/0033995 A1* | 2/2017 | Banka | H04L 41/0893 |
| 2018/0054418 A1* | 2/2018 | El Defrawy | H04L 63/0245 |
| 2019/0081961 A1* | 3/2019 | Bansal | H04L 67/10 |
| 2019/0121962 A1* | 4/2019 | Coleman | G06F 21/53 |
| 2020/0067880 A1* | 2/2020 | Kim | H04W 4/40 |

* cited by examiner

*Primary Examiner* — David J Pearson
(74) *Attorney, Agent, or Firm* — Klein, O'Neill & Singh, LLP (57) ABSTRACT

Methods and systems for a transportation vehicle are provided. One method includes generating a packet by an application executed by a processor of a first seat device of an in-flight entertainment system having a plurality of seat devices on an aircraft; dropping the packet by the seat device when the application is not authorized for Internet communication; dropping the packet by the seat device when the packet is one of a broadcast packet, multicast packet or destined to a second seat device of the in-flight entertainment system; determining that the seat device Internet traffic is below a threshold value; and transmitting the packet to a network device when the application is authorized, and the packet is not a broadcast packet, multicast packet or destined for a second seat device.

14 Claims, 10 Drawing Sheets

NETWORKING METHODS AND SYSTEMS FOR TRANSPORTATION VEHICLE ENTERTAINMENT SYSTEMS

TECHNICAL FIELD

The present disclosure relates to managing network bandwidth on transportation vehicles to support seat device streaming.

BACKGROUND

Transportation vehicles, for example, aircraft, trains, buses, recreation vehicle, boats and other similar vehicles use various computing devices for providing various functions, including entertainment, system control, content storage, and other functions. These computing devices include hardware (for example, servers, switches, network interface cards, storage adapters, storage devices and others) and software (for example, server applications, operating systems, firmware, management applications, application programming interface (APIs) and others).

Transportation vehicles today may have individualized functional equipment dedicated to a particular passenger seat, which can be utilized by the passenger, such as adjustable seats, adjustable environmental controls, adjustable lighting, telephony systems, video and/or audio entertainment systems, crew communication systems, and the like. Many commercial airplanes today may also have individualized video and audio entertainment systems, often referred to as "inflight entertainment" or "IFE" systems. Such systems may also be referred to as "inflight entertainment and communication" systems as well, and typically abbreviated as "IFEC" systems.

As one example of a function that a passenger may activate, entertainment systems for passenger carrier vehicles, such as commercial airlines, often have video displays installed at each passenger seat. For instance, video displays may be provided at each passenger seat, such as mounted at each of the seats of the passenger seats, and/or on cabin walls and/or deployable from an armrest for seats located at a bulkhead, i.e., in the first row of a section. Many of these systems allow each passenger to select from multiple video channels and/or audio channels, or even individually select and play videos from a library of videos. These video displays may also provide access to games, communication applications (e.g., telephone service, messaging, etc.), Internet browsing, and other computer applications. Sometimes such displays are referred to as smart monitors due to the ability to provide computer applications and process and store data internally.

Broadband Internet service is becoming common on aircrafts and other transportation vehicles. This has encouraged streaming by individual user devices, for example, streaming content from NetFlix® (without derogation of any third party trademark rights) or any other service. This presents challenges for aircraft and transportation vehicles with legacy seat device hardware with limited available network bandwidth. Therefore, networking technology is being developed to improve bandwidth usage and enable streaming for seat devices without having to upgrade seat device hardware.

SUMMARY

In one aspect, methods and systems system for transportation vehicles are disclosed. One method includes generating a packet by an application executed by a processor of a first seat device of an in-flight entertainment system having a plurality of seat devices on an aircraft; dropping the packet by the seat device when the application is not authorized for Internet communication; dropping the packet by the seat device when the packet is one of a broadcast packet, multicast packet or destined to a second seat device of the in-flight entertainment system; determining that the seat device Internet traffic is below a threshold value; and transmitting the packet to a network device when the application is authorized, and the packet is not a broadcast packet, multicast packet or destined for the second seat device. In a further aspect, the seat device disables launch of a browser from the application.

In another aspect, another method is provided. The method includes receiving a packet by a server interfacing with a plurality of seat devices of an in-flight entertainment system of an aircraft via a network device; determining whether the packet belongs to a network communication initiated by a first seat device; dropping the packet by the server when the packet is not part of the network communication; dropping the packet by the server when the packet is a certain type; dropping the packet by the server when combined bandwidth usage of the plurality of seat devices has reached a first threshold value or when bandwidth usage by the first seat device has reached a second threshold value; and forwarding the packet to the first seat device when the first threshold and the second threshold values have not been reached, the packet has not been dropped based on packet type and the packet is received in response to network communication initiated by the first seat device.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures.

DETAILED DESCRIPTION

As a preliminary note, the terms "component", "module", "system", and the like as used herein are intended to refer to a computer-related entity, either software-executing general purpose processor, hardware, firmware or a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory, computer/machine readable media including, but not limited to, an ASIC (application specific integrated circuit), CD (compact disc), DVD (digital video disk), ROM (read only memory), hard disk, EEPROM (electrically erasable programmable read only memory), solid state memory device or any other storage device, in accordance with the claimed subject matter. Conditional processing/routing may be expressed by either if or when, which are used interchangeably herein and intended to have the same meaning.

In one aspect, technology is provided for managing Internet bandwidth to enable seat device streaming. The bandwidth is managed by a server and each seat device sharing firewall operations. The server uses configurable rate limiting for each seat device and for total traffic to/from an In-flight entertainment (IFE) network.

When a packet is originated by a seat device application, the seat device filters the packet to ensure that the application is "Internet permitted." The packet is dropped when it includes a private network address or is addressed to any other seat device. Multicast and broadcast packets are also dropped. Internet browsing is limited to certain whitelisted URLs. The seat device also blocks connection attempts by an application. The seat device also monitors its own outgoing traffic to limit traffic from each application. Furthermore, the seat device disable the launch of any browser from any URL.

When a packet is received for an Internet connection, the server drops the packet, if the packet is not part of any communication that was initiated by a seat device. Certain packet types, for example, secure shell (SSH) or Internet Relay Chat (IRC) packets are dropped by the server. Details of server and seat device functionality are provided below.

In yet another aspect, when an aircraft does not include a server, Internet traffic is routed to seat devices of a virtual local area network (VLAN) by a network controller device. Each seat device executes various firewall operations for managing Internet bandwidth, as described below in detail.

Figure 1A:
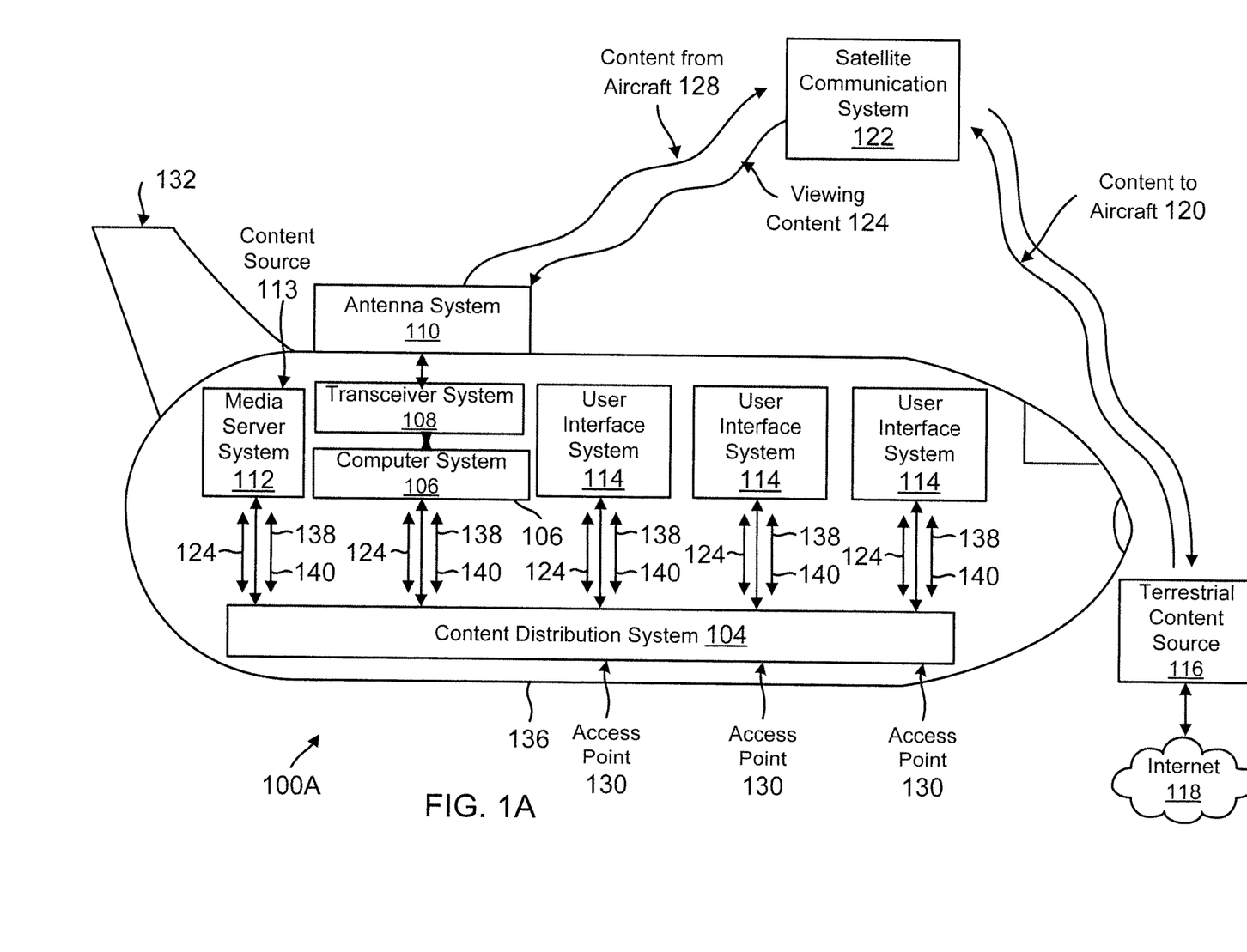
FIG. 1A shows an example of an operating environment for implementing the various aspects of the present disclosure on an aircraft.

Vehicle Information System:

FIG. 1A shows an example of a generic vehicle information system 100A (also referred to as system 100A) that can be configured for installation aboard an aircraft 132 for using the innovative technology described herein, according to one aspect of the present disclosure. When installed on an aircraft, system 100A can comprise an aircraft passenger IFE system, such as the Series 2000, 3000, eFX, eX2, eX3, eXW, NEXT, and/or any other inflight entertainment system developed and provided by Panasonic Avionics Corporation (without derogation of any trademark rights of Panasonic Avionics Corporation) of Lake Forest, Calif., the assignee of this application.

System 100A comprises at least one content source 113 and one or more user (or passenger) interface systems (may also be referred to as a seat device/seatback device) 114 that communicate with a real-time content distribution system 104. The content sources 113 may include one or more internal content sources, such as a media server system 112, that are installed aboard the aircraft 132, one or more remote (or terrestrial) content sources 116 that can be external from the aircraft 132, or a distributed content system.

The media server system 112 can be provided as an information system controller for providing overall system control functions for system 100A and/or for storing viewing content 124, including pre-programmed viewing content and/or content 120 downloaded to the aircraft, as desired. The viewing content 124 can include television programming content, music content, podcast content, photograph album content, audiobook content, and/or movie content without limitation. The viewing content 124 as shown and described herein are not exhaustive and are provided herein for purposes of illustration only and not for purposes of limitation.

The server system 112 can include, and/or communicate with, one or more conventional peripheral media storage systems (not shown), including optical media devices, such as a digital video disk (DVD) system or a compact disk (CD) system, and/or magnetic media systems, such as a video cassette recorder (VCR) system, a solid state drive (SSD) system, or a hard disk drive (HDD) system, of any suitable kind, for storing the preprogrammed content and/or the downloaded viewing content 120.

The viewing content 124 can comprise any conventional type of audio and/or video viewing content, such as stored (or time-delayed) viewing content and/or live (or real-time) viewing content. As desired, the viewing content 124 can include geographical information. Alternatively, and/or additionally, to entertainment content, such as live satellite television programming and/or live satellite radio programming, the viewing content likewise can include two-way communications, such as real-time access to the Internet 118 and/or telecommunications.

Being configured to distribute and/or present the viewing content 124 provided by one or more selected content sources 113, system 100A can communicate with the content sources 113 in real time and in any conventional manner, including via wired and/or wireless communications. System 100A and the terrestrial content source 116, for example, can communicate directly and/or indirectly via an intermediate communication system, such as a satellite communication system 122. System 100A thereby can receive content 120 from a selected terrestrial content source 116 and/or transmit (upload) content 128, including navigation and other control instructions, to the terrestrial content source 116. As desired, the terrestrial content source 116 can be configured to communicate with other terrestrial content sources (not shown). The terrestrial content source 116 is shown as providing access to the Internet 118. Although shown and described as comprising the satellite communication system 122 for purposes of illustration, the communication system can comprise any conventional type of wireless communication system, such as a cellular communication system (not shown) and/or an Aircraft Ground Information System (AGIS) communication system (not shown).

To facilitate communications with the terrestrial content sources 116, system 100A may also include an antenna system 110 and a transceiver system 108 for receiving the viewing content from the remote (or terrestrial) content sources 116. The antenna system 110 preferably is disposed outside, such as an exterior surface of a fuselage 136 of the aircraft 132. The antenna system 110 can receive content 120 from the terrestrial content source 116 and provide the content 120, as processed by the transceiver system 108, to a computer system 106 of system 100A. The computer system 106 can provide the received content 120 to the media (or content) server system 112 and/or directly to one or more of the user interfaces 114 as viewing content 124. Although shown and described as being separate systems for purposes of illustration, the computer system 106 and the media server system 112 can be at least partially integrated.

The user interface system 114 may be computing terminals in communication with an access point 130. The user interface system 114 provides a display device to view content. In one aspect, the user interface system 114 includes a hardware interface to connect to an access point 130 that provides a wired and/or a wireless connection for the user interface system.

In one aspect, the user interface system 114 comprises a processor executable application that a user downloads and installs to receive and view content via an access point 130. The user interface system 114 may also include an input system (not shown) for permitting the user (or passenger) to communicate with system 100A, such as via an exchange of control signals 138. For example, the input system can permit the user to enter one or more user instructions 140 for controlling the operation of system 100A. Illustrative user instructions 140 can include instructions for initiating communication with the content source 113, instructions for selecting viewing content 124 for presentation, and/or instructions for controlling the presentation of the selected viewing content 124. The input system can be provided in any conventional manner and typically includes a touch screen, one or more switches (or pushbuttons), such as a keyboard or a keypad, and/or a pointing device, such as a mouse, trackball, or stylus.

In one aspect, the user interface system 114 is provided at individual passenger seats of aircraft 132. The user interface system 114 can be adapted to different aircrafts and seating arrangements and the adaptive aspects described herein are not limited to any specific seat arrangements or user interface types.

Figure 1B:
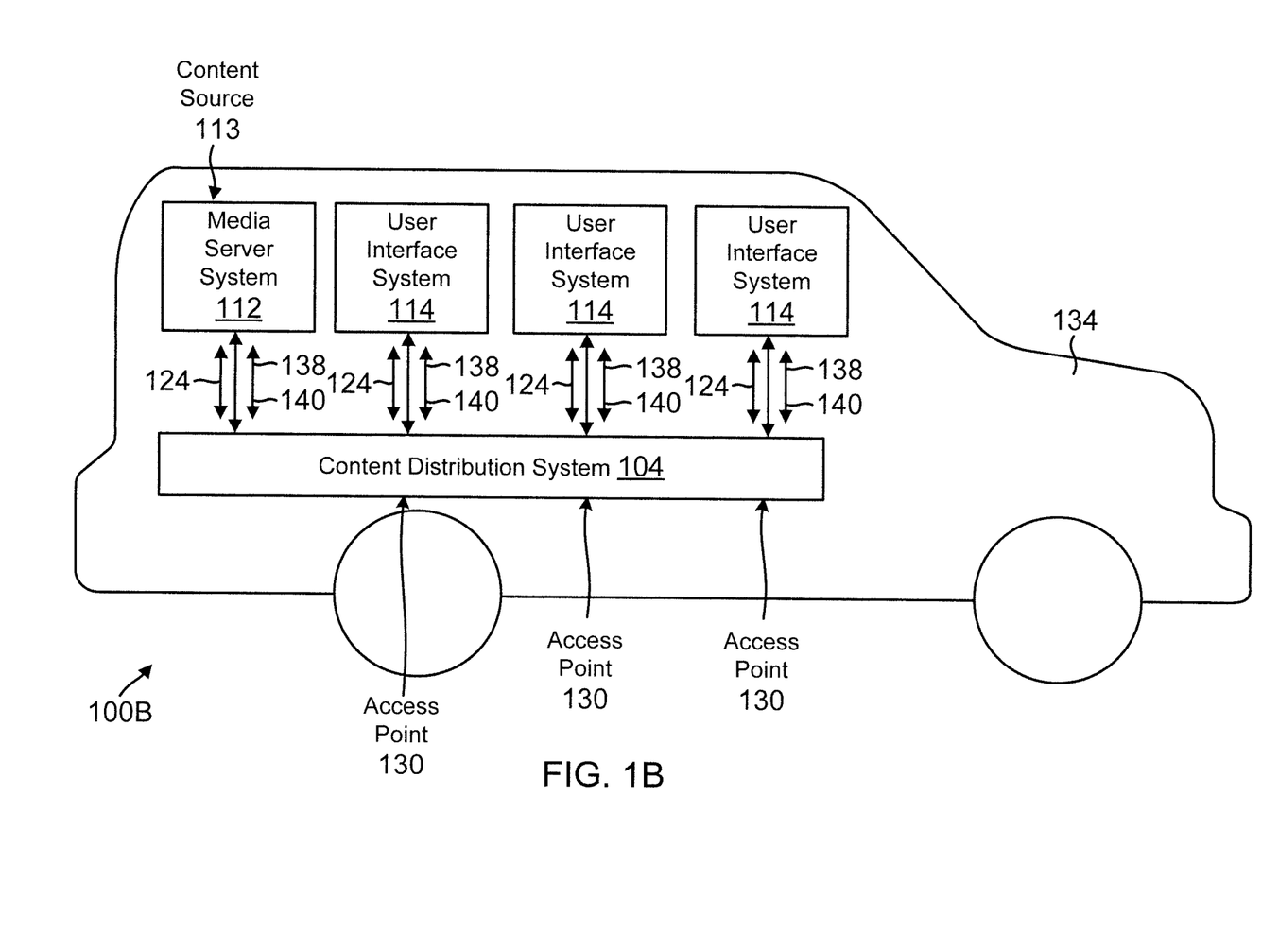
FIG. 1B shows an example of the operating environment on a non-aircraft transportation vehicle type, according to one aspect of the present disclosure.

FIG. 1B shows an example of implementing the vehicle information system 100B (may be referred to as system 100B) on an automobile 134 that may include a bus, a recreational vehicle, a boat, and/or a train, or any other type of passenger vehicle without limitation. The various components of system 100B may be similar to the components of system 100A described above with respect to FIG. 1A and for brevity are not described again.

Figure 2:
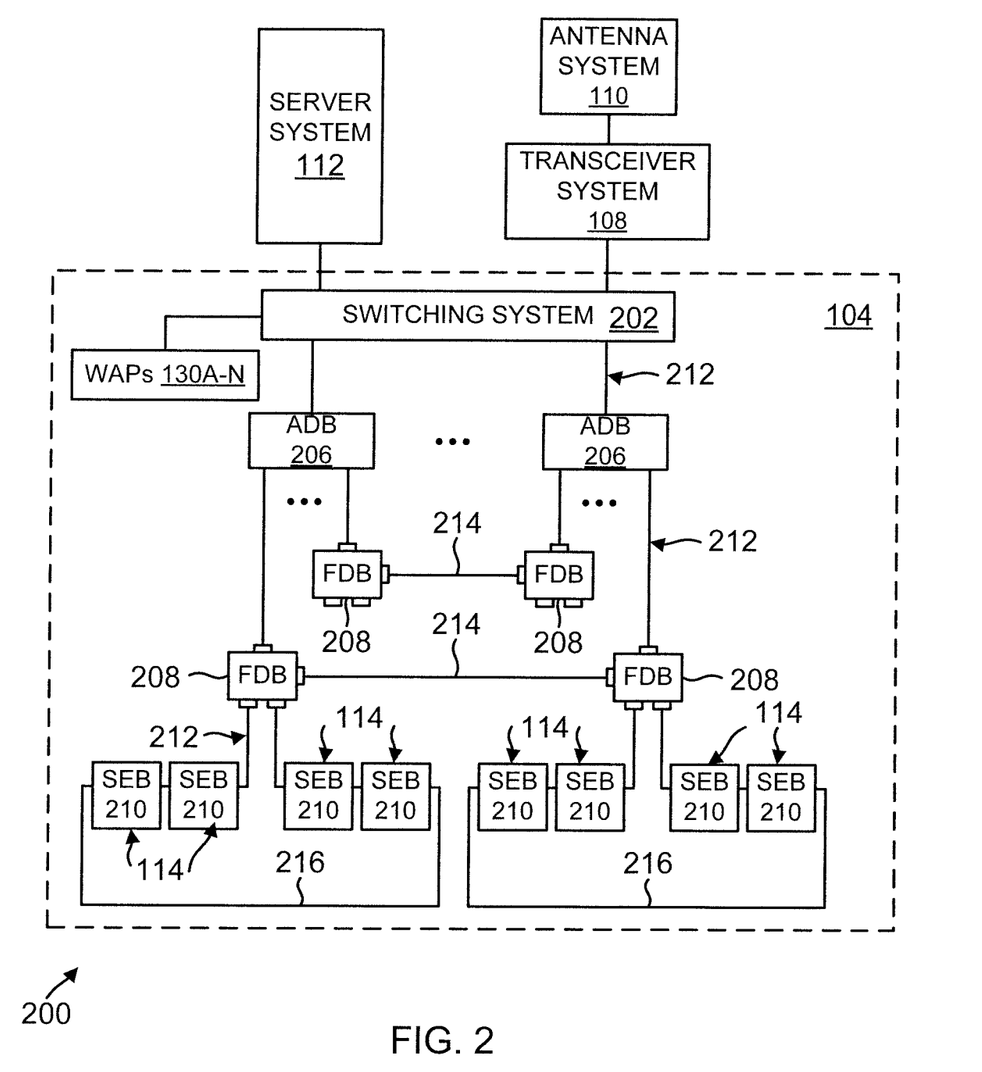
FIG. 2 shows an example of a content distribution system on an aircraft, used according to one aspect of the present disclosure.

Content Distribution System:

FIG. 2 illustrates an example of the content distribution system 104 for the vehicle information system 200 (similar to 100A/100B), according to one aspect of the present disclosure. The content distribution system 104 couples, and supports communication between the server system 112, and the plurality of user interface systems 114.

The content distribution system 104, for example, can be provided as a conventional wired and/or wireless communication network, including a telephone network, a local area network (LAN), a wide area network (WAN), a campus area network (CAN), personal area network (PAN) and/or a wireless local area network (WLAN) of any kind. Exemplary wireless local area networks include wireless fidelity (Wi-Fi) networks in accordance with Institute of Electrical and Electronics Engineers (IEEE) Standard 802.11 and/or wireless metropolitan-area networks (MANs), which also are known as WiMax Wireless Broadband, in accordance with IEEE Standard 802.16. Preferably being configured to support high data transfer rates, the content distribution system 104 may comprise a high-speed Ethernet network, such as any type of Fast Ethernet (such as 100 Base-X and/or 100 Base-T) communication network and/or Gigabit (such as 1000 Base-X and/or 1000 Base-T) Ethernet communication network, with a typical data transfer rate of at least approximately one hundred megabits per second (100 Mbps) or any other transfer rate. To achieve high data transfer rates in a wireless communications environment, free-space optics (or laser) technology, millimeter wave (or microwave) technology, and/or Ultra-Wideband (UWB) technology can be utilized to support communications among the various system resources, as desired.

As illustrated in FIG. 2, the distribution system 104 can be provided as a plurality of area distribution boxes (ADBs) 206, a plurality of floor disconnect boxes (FDBs) 208, and a plurality of seat electronics boxes (SEBs) (and/or video seat electronics boxes (VSEBs) and/or premium seat electronics boxes (PSEBs)) 210 being configured to communicate in real time via a plurality of wired and/or wireless communication connections 212. The distribution system 104 likewise can include a switching system 202 for providing an interface between the distribution system 104 and the server system 112. The switching system 202 can comprise a conventional switching system, such as an Ethernet switching system, and is configured to couple the server system 112 with the area distribution boxes 206. Each of the area distribution boxes 206 is coupled with, and communicates with, the switching system 202. In addition, the distribution system 104 includes one or more wireless access points (WAPs) (130A to 130N) connected in communication with the switch system 202 for wireless distribution of content to user interface systems 114 including PEDs.

Each of the area distribution boxes 202, in turn, is coupled with, and communicates with, at least one floor disconnect box 208. Although the area distribution boxes 206 and the associated floor disconnect boxes 208 can be coupled in any conventional configuration, the associated floor disconnect boxes 208 preferably are disposed in a star network topology about a central area distribution box 206 as illustrated in FIG. 2. Each floor disconnect box 208 is coupled with, and services, a plurality of daisy-chains of seat electronics boxes 210. The seat electronics boxes 210, in turn, are configured to communicate with the user interface systems 114. Each seat electronics box 210 can support one or more of the user interface systems 114.

The switching systems 202, the area distribution boxes 206, the floor disconnect boxes 208, the seat electronics boxes (and/or video seat electronics boxes (VSEBs) and/or premium seat electronics boxes (PSEBs)) 210, the antenna system 110, the transceiver system 108, the content source 113, the server system 112, and other system resources of the vehicle information system preferably are provided as line replaceable units (LRUs). The use of LRUs facilitate maintenance of the vehicle information system 200 because a defective LRU can simply be removed from the vehicle information system 200 and replaced with a new (or different) LRU. The defective LRU thereafter can be repaired for subsequent installation. Advantageously, the use of LRUs can promote flexibility in configuring the content distribution system 104 by permitting ready modification of the number, arrangement, and/or configuration of the system resources of the content distribution system 104. The content distribution system 104 likewise can be readily upgraded by replacing any obsolete LRUs with new LRUs.

The distribution system 104 can include at least one FDB internal port bypass connection 214 and/or at least one SEB loopback connection 216. Each FDB internal port bypass connection 214 is a communication connection 212 that permits floor disconnect boxes 208 associated with different area distribution boxes 206 to directly communicate. Each SEB loopback connection 216 is a communication connection 212 that directly couples the last seat electronics box 210 in each daisy-chain of seat electronics boxes 210 for a selected floor disconnect box 208 as shown in FIG. 2. Each SEB loopback connection 216 therefore forms a loopback path among the daisy-chained seat electronics boxes 210 coupled with the relevant floor disconnect box 208.

It is noteworthy that the various aspects of the present disclosure may be implemented without using FDB 208. When FDB 208 is not used, ADB 206 communicates directly with SEB 210 and/or server system 112 may communicate directly with SEB 210 or the seats. The various aspects of the present disclosure are not limited to any specific network configuration.

Figure 3A:
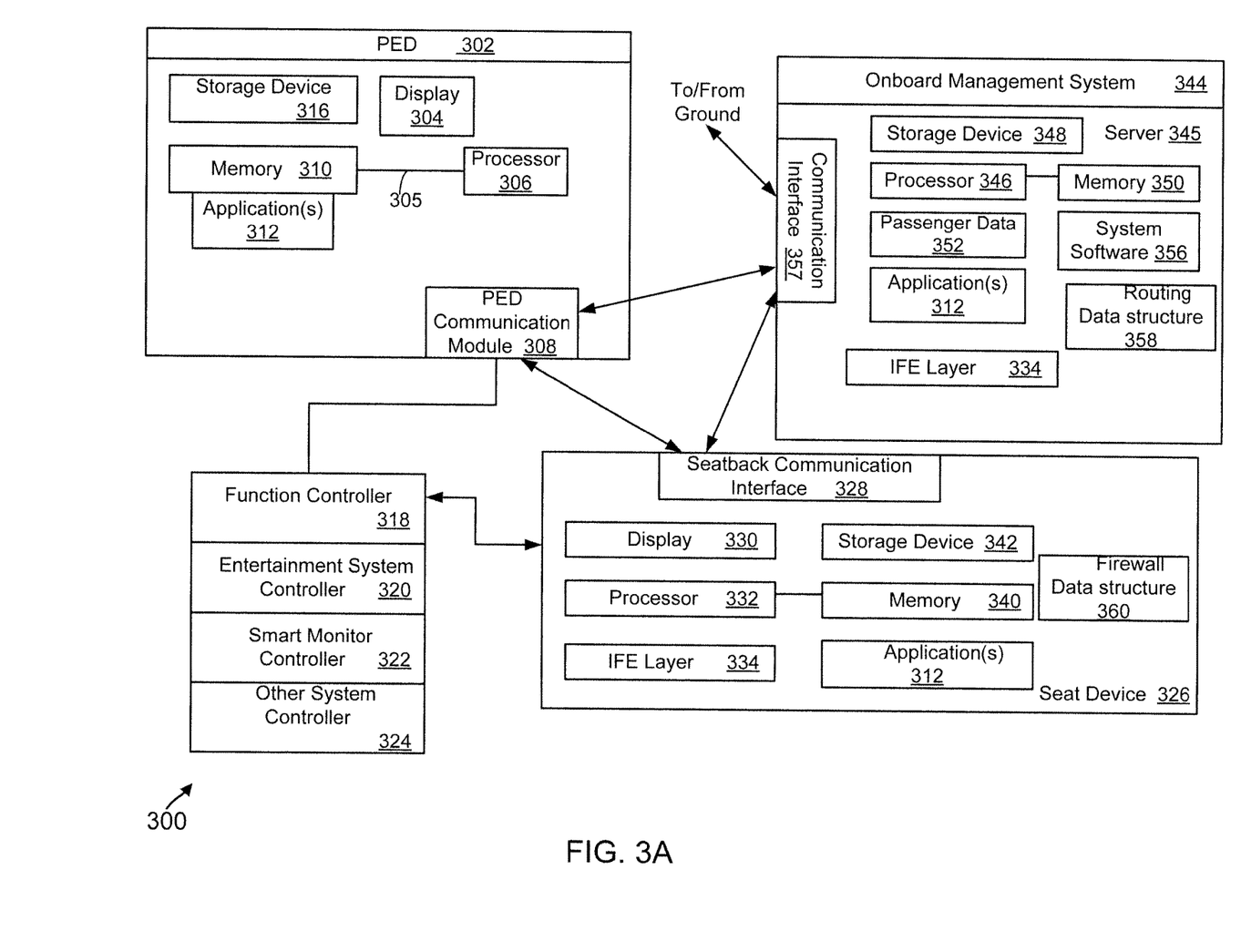
FIG. 3A shows an example of a seat device interfacing with other systems of an aircraft, according to one aspect of the present disclosure.
Figure 3B:
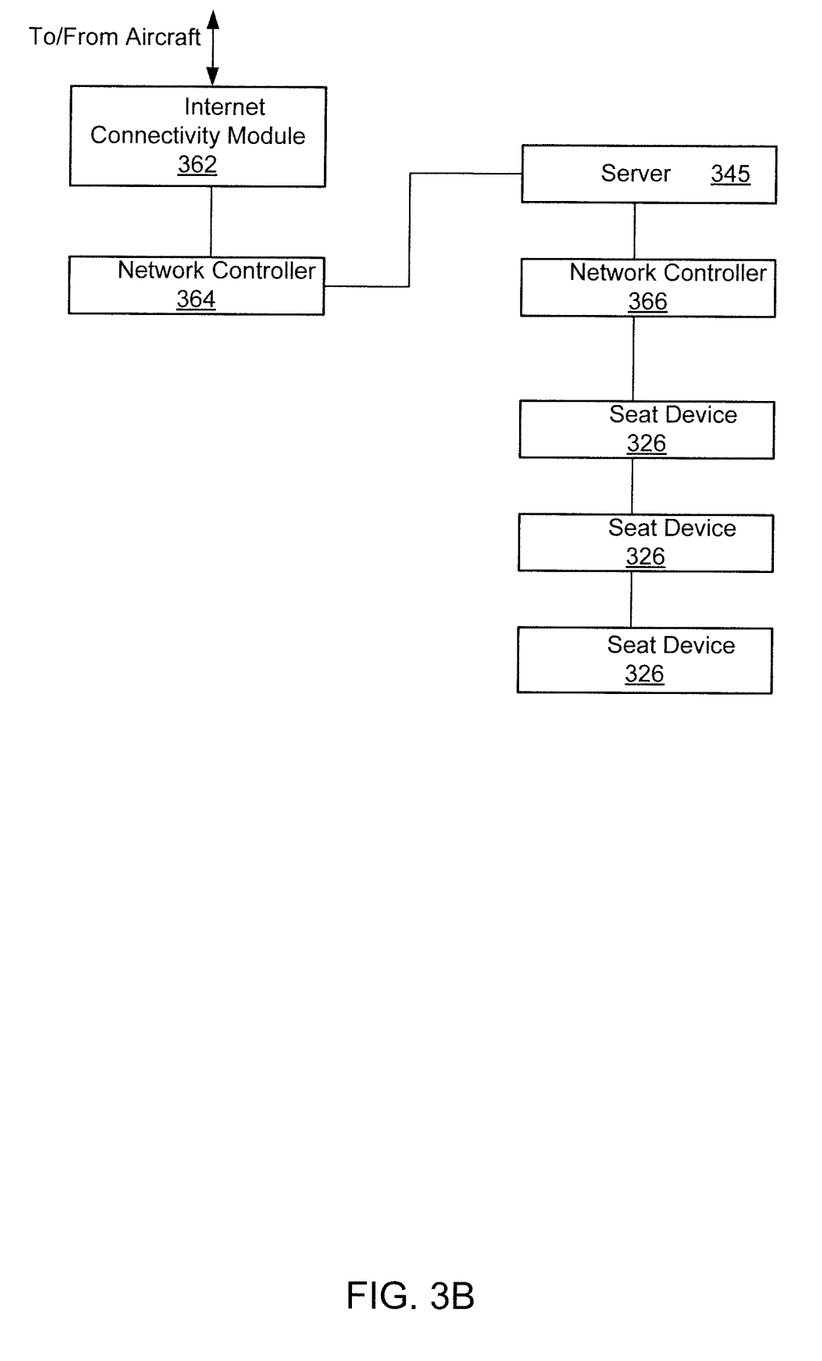
FIG. 3B shows an example of a system efficiently using Internet bandwidth on an aircraft, according to one aspect of the present disclosure.
Figure 3C:
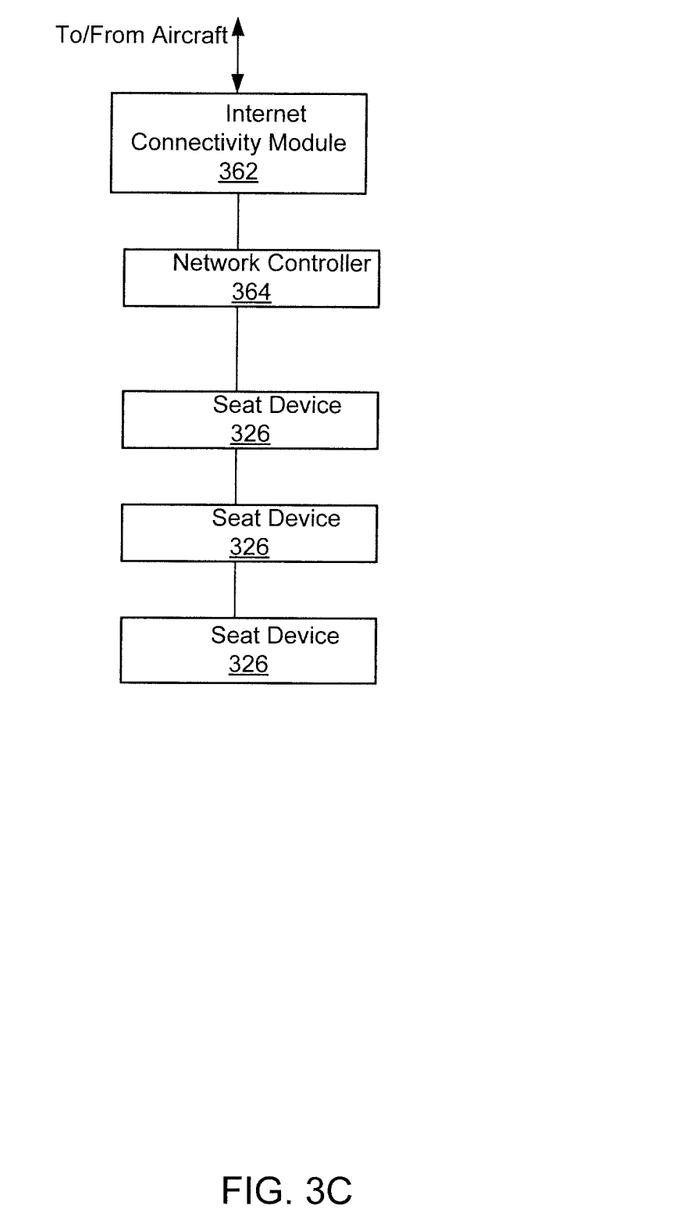
FIG. 3C shows an example of a server-less system efficiently using Internet bandwidth on an aircraft, according to one aspect of the present disclosure.

IFE System:

FIG. 3A shows an example of a system 300 using the innovative computing/display technology, according to one aspect of the present disclosure. System 300 includes an onboard management system 344, a seat device 326 (may also be referred to as seatback device or a smart monitor), PED 302, and a function controller 318. The onboard management system 344 may be similar to server 112/ computer system 106 described above with respect to FIGS. 1A/1B. The seat device 326 may be part of the user interface system 114 or interfaces with the user interface system 114 described above with respect to FIGS. 1A/1B. It is noteworthy that the seat device 326 need not be mounted on the back of a seat and may be supported from other structures, such as a bulkhead, wall, arm of a seat, etc. The adaptive aspects of the present disclosure are not limited to any specific type, location or orientation of the seat device 326. Furthermore, system 300 may also include switches, routers and other networking devices that are shown in FIGS. 2, 3B and 3C.

In one aspect, the seat device 326 includes a display device or simply "display" 330, a processor 332, a memory 340, a communication interface 328 and a local storage device 342 for storing content. Processor 332 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

In one aspect, processor 332 executes an IFE layer (may also be referred to as IFE controller) 334 that provides inflight entertainment and other options to users. The IFE layer 334 uses the communication interface 328 to interface with the onboard management system 344 and/or PED 302. The IFE layer 334 provides audio/video content as well as controls for accessing the content.

Processor 332 also executes one or more applications 312 out of memory 340. The applications may be categorized based on application functionality and use of network bandwidth. For example, applications that do not need to communicate data over a network are considered to be in Category 1, applications that may need to use an IFE network (FIG. 2) are considered to be in Category 2, applications that may need to use an Internet connection are considered to be in Category 3, and applications that may have to use both the IFE network and an Internet connection are considered to be in Category 4.

In one aspect, processor 332 has access to a firewall data structure 360 (may also be referred to as data structure 360) that is configured to implement the adaptive aspects of the present disclosure. Data structure 360 is used to block Category 1 applications from sending any data over a network. Data structure 360 stores instructions to block Category 2 applications from sending data to Internet bound traffic. Data structure 360 includes instructions to block Category 3 applications from generating any IFE network traffic. Category 3 applications are "Internet Permitted" and are provided a default route to an Internet connection. Category 4 applications have the same permissions as Category 2 applications and are assigned a default route, similar to Category 3 applications.

In one aspect, data structure 360 stores a list of URLs that are whitelisted for one or more applications. This enables seatback browsing from a seat device browser only. Data structure 360 also includes rules that indicate to processor 332 to drop a packet that is destined for another seat device (except for Category 4 applications that are authorized to use the IFE network) or has a private network address (e.g. Internet Protocol ("IP")) address. Data structure 360 may also include instructions to drop any broadcast or multicast packets, or connection attempt in a domain name server (DNS) query.

Data structure 360 also stores a threshold value to throttle outgoing Internet traffic from the seat device 326. Data structure 360 further includes instructions to disable launch of any browser from any URL at the seat device 326. If a user clicks on a URL link, the user is able to access an application at the seat device. Data structure 360 is also used to store one or more configuration settings to disable a "background refresh operation". The refresh operation is used by the Android (without derogation of any third party trademark rights) operating system and consumes Internet bandwidth. Data structure 360 prevents use of the Internet bandwidth by the seat device, when a user has been inactive for a certain period. This is used to conserve Internet bandwidth usage.

In one aspect, when an application 312 starts at seat device 326, the seat device processor 332 captures a dynamic user identifier that is assigned by an operating system of the seat device (e.g. Android). Processor 332 builds the firewall rules appropriate to the application's category, using data structure 360. Details for using the data structure 360 are provided below.

In one aspect, the onboard management system 344 includes a server 345 (similar to media server 112 and/or computer system 106). The server 345 includes a processor 346 that has access to a memory 350 via a bus system, similar to bus 305 described below in detail.

Processor 346 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Processor 346 has access to a storage device 348 that may be used to store data, applications, structured or unstructured data and program files including applications 312, system software 356, and/or the IFE layer 334.

In one aspect, the onboard management system 344 maintains passenger data 352 that identifies each passenger for a flight, a seat assigned to a passenger and any other information that can uniquely identify the passenger. The passenger data 352 may be populated from an electronic boarding pass that is used by a passenger and/or from the carrier operating the aircraft.

System software 356 of the onboard management system 344 is executed by the processor 346 to control the overall operation of the server 345.

Server 345 also stores a routing data structure 358 (may also be referred to as data structure 358). The information stored at data structure 358 is used to manage Internet bandwidth usage, as described below in more detail. It is noteworthy, for an aircraft that does not use server 345 (see FIG. 3C), the information stored at data structure 358 is included in data structure 360 of the seat device 326.

As an example, data structure 358 stores a configurable, first threshold value for controlling the total bandwidth for Internet traffic (e.g. 100 Mbps) by a plurality of seat devices. The data structure 358 also stores a configurable, second threshold value to limit outgoing traffic from each seat device 326. Data structure 358 also includes instructions to drop all incoming packets to the aircraft via an Internet connection when a network communication (e.g. a TCP communication) is not initiated by a seat device. Data structure 358 also stores instructions to drop certain incoming packet types, for example, SSH or IRC packets and permit certain outgoing packets, for example, UDP ("User Datagram Protocol") and ICMP ("Internet Control Message Protocol") packets. Further details for using data structure 358 are provided below.

In one aspect, server 345 communicates with PED 302 and/or seat device 326 via a communication interface 357. The communication interface 357 may also be used to receive information from the ground. The communication interface 357 includes one or more interfaces for a wired and/or wireless connection, as described above with respect to FIGS. 1A/1B and 2.

The PED 302 may also be used with the onboard management system 344 for activating a function or requesting a service, in one aspect of the present disclosure. The PED 302 may be optionally paired or associated with the seat device 326.

In one aspect, the PED 302 may be a mobile phone, a notebook, a tablet, a laptop or any other similar device. PED 302 may include a processor 306 that has access to a memory 310 via an interconnect/bus 305 for executing stored instructions. Processor 302 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The bus system 305 is an abstraction that represents any one or more separate physical buses and/or point-to-point connections, connected by appropriate bridges, adapters and/or controllers. The bus system 305, therefore, may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

PED 302 includes a storage device 316 that may be, or may include any storage medium for storing data in a non-volatile manner, such as one or more magnetic or optical based disks, flash memory, or solid-state drive. The storage device 316 may store content that is displayed on a display 304 of PED 302 and other information. In one aspect, display 304 may also include a touch screen for receiving input commands.

The storage device 316 may further store pairing data that includes pairing information for securely pairing the PED 302 with the seat device 326 or any other aircraft system. The term "pair", and other grammatical forms such as "pairing", means that the PED 302 is associated with a particular passenger seat such that communications received by seat device 326 from the PED 302 are recognized as being related to that passenger seat and/or such communications control functions associated with the particular passenger seat and controlled by the function controller 318. The term automatic as associated with pairing means that the PED is paired with minimal passenger involvement. In one aspect, the pairing data includes PED 302 identification information, and/or configuration information that is used to pair the PED 302 including a seat identifier.

The storage device 316 may also store the application(s) 312 and executed out of memory 310. In one aspect, application 312 enables the PED 302 to automatically pair with a transportation vehicle system in general and to the seat device 326 in particular, with minimal passenger involvement. In one aspect, application 312 may be stored on a storage device of an application store ("App Store") (not shown) such as that operated by Apple, Inc. under the trademark ITUNES, the application store operated by Google, Inc. under the trademark GOOGLE PLAY, or the application store operated by Microsoft Corporation under the trademark WINDOWS STORE, without derogation of any third party trademark rights. Alternatively, the app store may be a website server for a website operated by a provider of the on-board management system 344 such as the manufacturer or a carrier operating the vehicle (e.g., a commercial airline, train operator, cruise line, bus line, etc.).

It is noteworthy that application 312 may be executed in a distributed environment, for example, partly by seat device 326 and/or the onboard management system 344. The adaptive aspects described herein are not limited to any specific location for executing application 312.

In one aspect, the function controller 318 communicates with a PED communication module 308 that includes one or more interfaces to communicate with different devices, including a Wi-Fi interface, Bluetooth interface, NFC (Near Field Communication) interface and others. The adaptive aspects described herein are not limited to any specific interface. It is noteworthy that although a single block is shown for the PED communication module 308 for convenience, the communication module 308 may have different interface, cards, logic and circuitry to comply with the different communication protocols/standards.

In one aspect, the function controller 318 provides a controller 320 to control the entertainment system for accessing audio/video content, and a controller 322 for controlling a display of seat device 326. Other system controller 324 may include a controller for controlling the lighting system for controlling lights for a passenger seat, e.g., a reading light, a controller for an attendant call system to call an attendant, a controller for a telephone system, a controller for food service to order food, a controller for making seat adjustments and others. The various aspects disclosed herein are not limited to any particular type of function.

FIG. 3B shows an example of a system with an Internet connectivity module 362 (may be referred to as module 362) that enables Internet connection for seat devices 326. Module 362 is operationally coupled to a network controller 364 that is coupled to server 345. In one aspect, network controller 364 may be a router, switch, ADB or any other networking device that can receive and route Internet traffic to an IFE network. Network controller 364 includes one or more ports, a processor, on-board memory that stores firmware instructions and other components. The ports include circuitry and logic for receiving and transmitting network packets. As an example, server 345 is also coupled to another network controller 366 that sends and receives network packets to and from the seat devices 326.

In one aspect, module 362 is assigned a specific network address. The seat devices are part of an external and internal virtual local area network (VLAN). The network controller 364 receives network packets from module 362 and forwards the packets to server 345 that may include a "head-end router box" (not shown).

The router box at server 345 filters network traffic and performs network address translation to identify the VLAN and the seat device associated with the VLAN. The received packets are then forwarded to the network controller 366 for transmission to the destination seat device 326, as described below in more detail. Each seat device only sees traffic destined for its network address.

For outgoing transmissions, such as packets originated by the seat devices 326, and transmitted using one or more of network controller 366, server 345, and network controller 364 via module 362, are described below in detail.

In one aspect, network controller 364/366 are not a member of the VLAN. This prevents attacks from a malicious application executed by a seat device.

FIG. 3C shows a "server less" system where network controller 364 performs the network address translation and forwards received packets to a destination seat device based on VLAN tags. The destination seat device using information from data structures 358 and 360 performs firewall functionality. For example, a packet received by a seat device that is not part of a network communication (e.g. a TCP communication) is dropped by the seat device. The seat device also drops SSH and IRC packets, while allowing UDP and ICMP packets as described below in more detail.

Figure 4A:
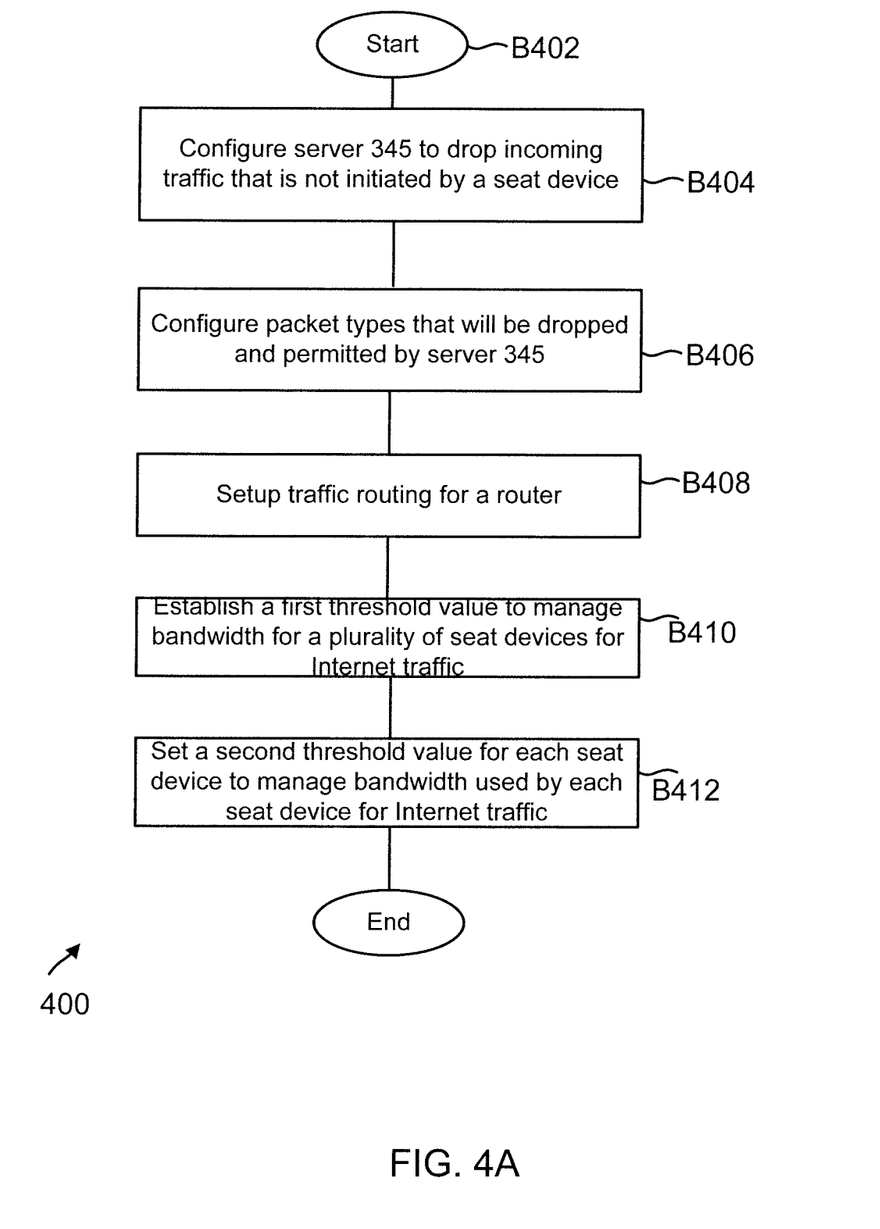
FIG. 4A shows a process flow for configuring an IFE system, according to one aspect of the present disclosure.

Process Flows:

FIG. 4A shows a process flow 400 according to one aspect of the present disclosure. In this regard, the process blocks of FIG. 4A are executed by a processor executing instructions out of a memory device. The process begins in block B402, before an aircraft is in-flight. In block B404, the server 345 is configured to drop any incoming traffic that is not initiated by a seat device. For example, when a packet is received via module 362, server 345 is configured to drop any TCP communication that is not initiated by any seat device 326. This information is stored at routing data structure 358. It is noteworthy that when a server 345 is not used, for example, in FIG. 3C, then this information is stored at data structure 360 for each seat device 326.

Process 400 also configures server 345 to drop certain packet types in block B406. For example, SSH and IRC packets are configured to be dropped, while UDP and ICMP packets are configured to be permitted. This information is again stored at routing data structure 358 and is used to drop or allow packet processing by the server. As mentioned above, if a system similar to FIG. 3C is used, then this information is stored in data structure 360.

In block B408, packet routing to network controller 364 and 366 is configured. This enables traffic from seat devices 326 and restricts packets with private IP address or packets that are originated by one seat device and destined to another seat device (except for Category 4 applications). In a system without server 345, this information is stored at data structure 360.

In block B410, a first threshold value is established for managing total Internet bandwidth used by a plurality of seat device. As an example, the first threshold value may be set to 100 Mbps. In block B412, a second threshold value is established for each seat device 326. The second threshold value is set to limit Internet traffic to and from each seat device, for example, to 5 Mbps. The adaptive aspects disclosed herein are not limited to any specific threshold values. The threshold values may be stored in data structures 358/360.

Figure 4B:
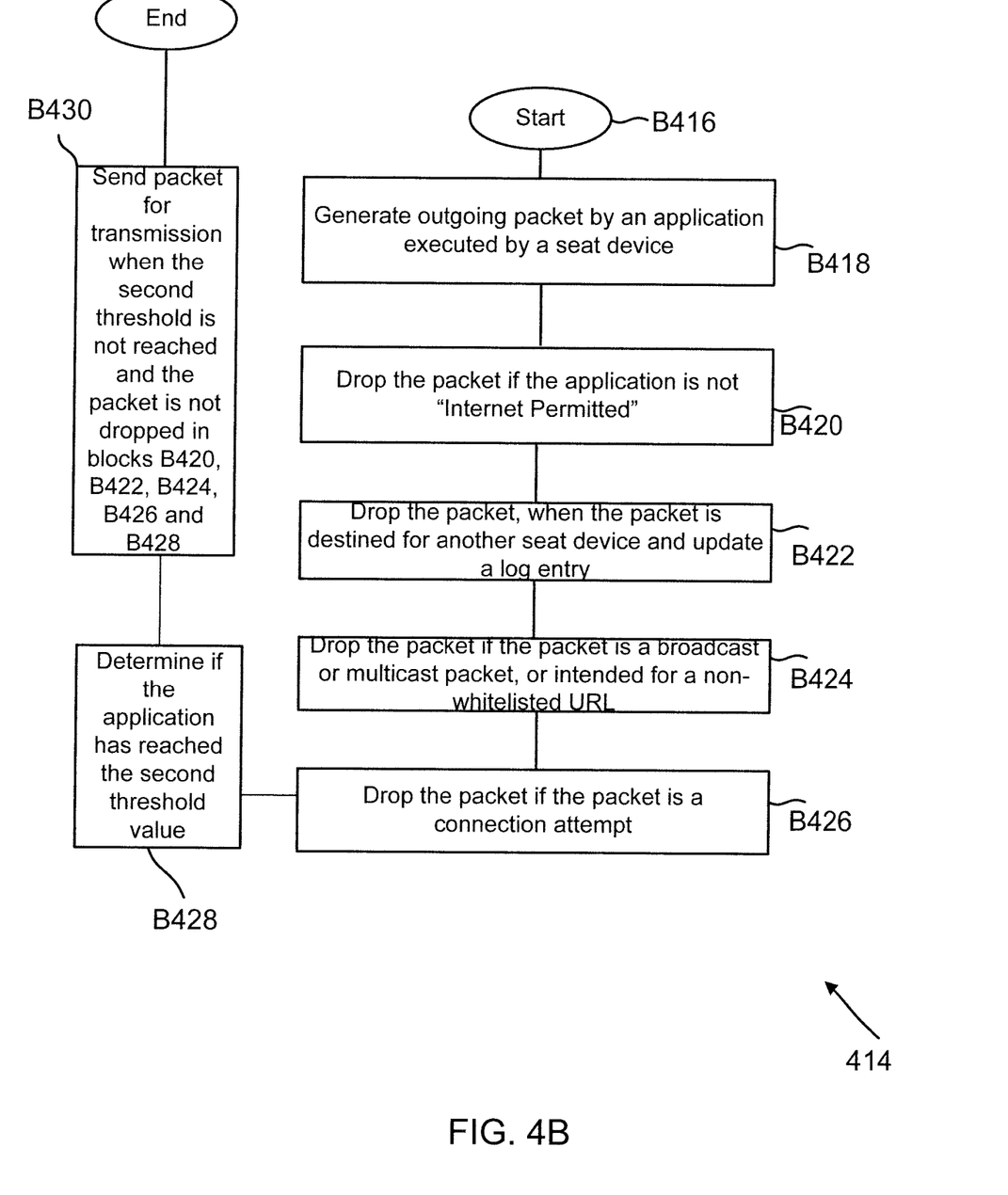
FIG. 4B shows a process flow for transmitting packets by an IFE system, according to one aspect of the present disclosure.

FIG. 4B shows a process 414 for managing outgoing traffic from a seat device 326 of an IFE system, according to one aspect of the present disclosure. In one aspect, process 414 begins in block B416 after the seat device 326 has established a network connection. The firewall rules associated with outgoing traffic are stored at data structure 360, accessible to processor 332, described above in detail.

In block B418, an outgoing packet is generated by an application executed by processor 332. In block B420, the process first determines if the application is "Internet permitted". This is based on the category of the application, as described above. If the application is not "Internet permitted", then the packet is dropped.

In block B422, the packet may also be dropped if the packet is destined for another seat device or to a private IP address (except for a Category 4 application packet). The seat device 326 uses data structure 360 to determine if the packet is destined for another seat device or includes a private IP address. When the packet is dropped, a security log (not shown) is updated indicating an error.

The packet may also be dropped in block B424, if the packet is a broadcast or multicast packet. A broadcast packet is destined to all the members of a VLAN, while the multicast packet is destined for multiple recipients. The packet may also be dropped when the packet is for a uniform resource location (URL) that has not been whitelisted. As described above, the whitelisted URLs are stored at data structure 360.

The packet may also be dropped in block B426, when the packet is a connection attempt by the application. For DNS queries, the operating system of the seat device 326 defaults to a query of a local file to resolve host names. A DNS server (not shown) is configured as a forwarding DNS for any addresses that are not found in the local file. Only applications that belong to the seat device 326 VLAN are able to communicate with the DNS server.

In block B428, the seat device 326 determines if transmitting the packet would reach a rate limiting threshold value (i.e. the second threshold value described above with respect to FIG. 4A). If yes, the packet is dropped. If not, then in block B432, the packet is sent to the network controller 366 for transmission to its destination.

Figure 4C:
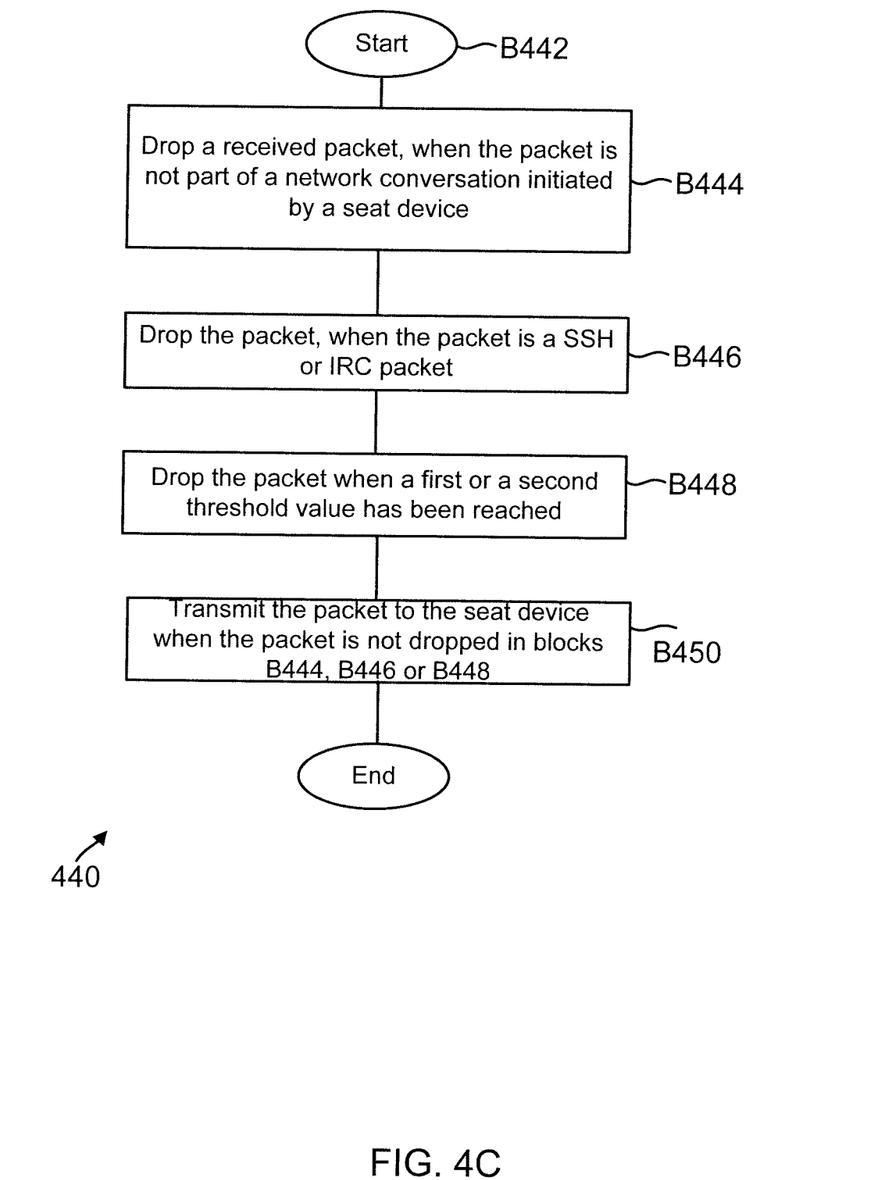
FIG. 4C shows a process flow for receiving packets by an IFE system, according to one aspect of the present disclosure.

FIG. 4C shows a process 440 for managing incoming Internet traffic, according to one aspect of the present disclosure. Process 440 may be executed by server 345 using data structure 358 or the seat device 326 using data structure 360 in a server-less system (FIG. 3C). The process begins in block B442, after a seat device 326 has been initialized and has established a network connection. In block B444, a packet is received via module 362. If the received packet is not part of a network communication initiated by the seat device 326, then the packet is dropped in block B444. For example, if the packet is not part of a TCP communication initiated by the seat device 326, then the packet is dropped. The packet may also be dropped in block B446 if the packet is a SSH or an IRC packet. The packet may also be dropped in block B448, when the first or second threshold values have been reached. If the packet is not dropped in blocks B444, B446 and B448, then the packet is forwarded to the seat device 326 via the network controller 366.

In one aspect, methods and systems system for transportation vehicles are provided. One method includes generating a packet by an application executed by a processor of a first seat device of an in-flight entertainment system having a plurality of seat devices on an aircraft; dropping the packet by the seat device when the application is not authorized for Internet communication; dropping the packet by the seat device when the packet is one of a broadcast packet, multicast packet or destined for a second seat device of the in-flight entertainment system; determining that the seat device Internet traffic is below a threshold value; and transmitting the packet to a network device when the application is authorized and the packet is not a broadcast packet, multicast packet or destined for a second seat device.

In another aspect, another method is provided. The method includes receiving a packet by a server interfacing with a plurality of seat devices of an in-flight entertainment system of an aircraft via a network device; determining whether the packet belongs to a network communication initiated by a first seat device; dropping the packet by the server when the packet is not part of the network communication; dropping the packet by the server when the packet is a certain type; dropping the packet by the server, when combined bandwidth usage of the plurality of seat devices has reached a first threshold value or when bandwidth usage by the first seat device has reached a second threshold value; and forwarding the packet to the first seat device, when the first threshold and the second threshold values have not been reached, the packet has not been dropped based on packet type and the packet is received in response to network communication initiated by the first seat device.

Figure 5:
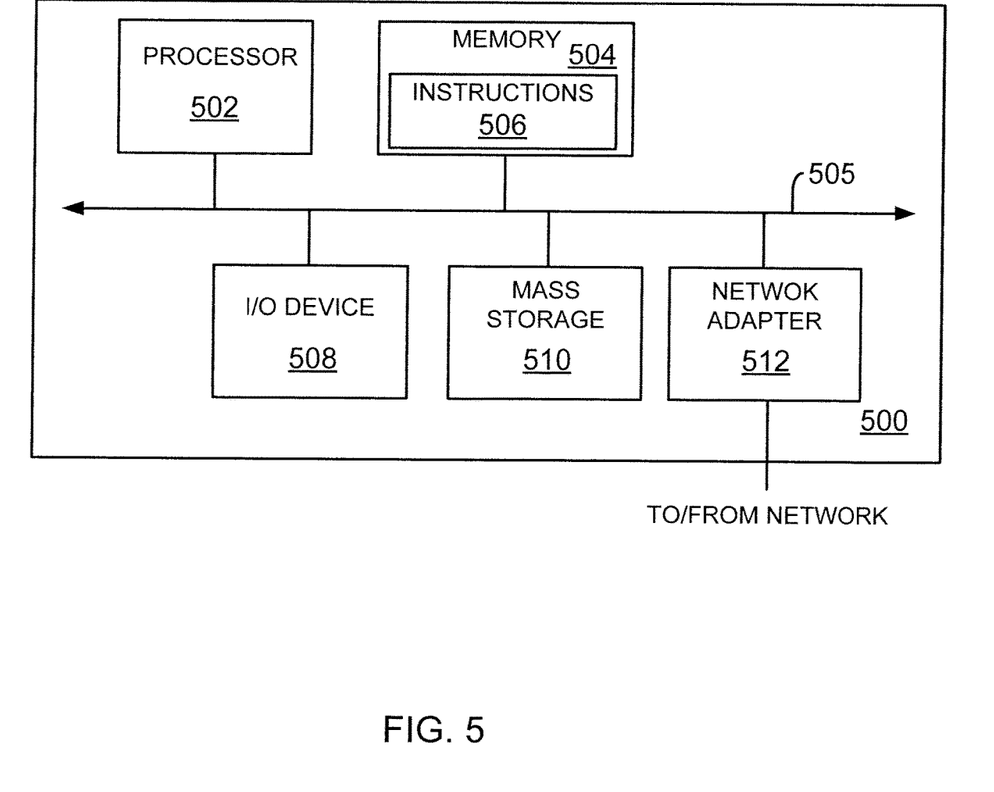
FIG. 5 shows a block diagram of a computing system, used according to one aspect of the present disclosure.

Processing System:

FIG. 5 is a high-level block diagram showing an example of the architecture of a processing system 500 that may be used according to one aspect. The processing system 500 can represent media server 112, computing system 106, WAP 130, onboard management system 344, seat device 326, or any user device (PED 302) that attempts to interface with a vehicle computing device. Note that certain standard and well-known components which are not germane to the present aspects are not shown in FIG. 5.

The processing system 500 includes one or more processor(s) 502 and memory 504, coupled to a bus system 505. The bus system 505 shown in FIG. 5 is an abstraction that represents any one or more separate physical buses and/or point-to-point connections, connected by appropriate bridges, adapters and/or controllers. The bus system 505, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

The processor(s) 502 are the central processing units (CPUs) of the processing system 500 and, thus, control its overall operation. In certain aspects, the processors 502 accomplish this by executing software stored in memory 504. A processor 502 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 504 represents any form of random access memory (RAM), read-only memory (ROM), flash memory, or the like, or a combination of such devices. Memory 504 includes the main memory of the processing system 500. Instructions 506 may be used to store data structures 358/360 and implement the process steps of FIGS. 4A-4C described above.

Also connected to the processors 502 through the bus system 505 are one or more internal mass storage devices 510, and a network adapter 512. Internal mass storage devices 510 may be, or may include any conventional medium for storing large volumes of data in a non-volatile manner, such as one or more magnetic or optical based disks, flash memory, or solid-state drive.

The network adapter 512 provides the processing system 500 with the ability to communicate with remote devices (e.g., over a network and may be, for example, an Ethernet adapter or the like.

The processing system 500 also includes one or more input/output (I/O) devices 508 coupled to the bus system 505. The I/O devices 508 may include, for example, a display device, a keyboard, a mouse, etc. The I/O device may be in the form of a handset having one or more of the foregoing components, such as a display with a real or virtual keyboard, buttons, and/or other touch-sensitive surfaces.

Thus, methods and systems for network communication on a transportation vehicle have been described. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

In an alternative aspect, packets may be rejected in which a reply is sent to the sender of the packet. Dropping a packet as used herein means the packet is not further processed without a reply being sent. This is sometimes also referred to as silently rejecting a packet. Generally, dropping a packet (silently rejecting it) is safer from a security view point because it provides less information to an attacker.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method comprising:
   generating a packet by an application executed by a processor of a first seat device of an in-flight entertainment system having a plurality of seat devices on an aircraft;
   dropping the packet by the seat device when the application is not authorized for Internet communication;
   dropping the packet by the seat device when the packet is one of a broadcast packet, multicast packet or destined to a second seat device of the in-flight entertainment system;
   determining that the seat device Internet traffic is below a threshold value; and
   transmitting the packet to a network device when the application is authorized, and the packet is not a broadcast packet, multicast packet or destined for the second seat device.

2. The method of claim 1, wherein the seat device drops a packet when the packet is a network connection attempt from outside the seat device.

3. The method of claim 1, wherein the seat device drops the packet when the seat device has reached the threshold value.

4. The method of claim 1, wherein the network device drops the packet when another threshold value controlling throughput for the plurality of seat devices is reached.

5. The method of claim 1, wherein the seat device drops the packet when the packet is for a non-authorized uniform resource locator (URL).

6. The method of claim 1, wherein the seat device drops the packet when the packet is destined to a private Internet Protocol address.

7. The method of claim 1, wherein the packet is dropped when the packet is one of a secure shell and an Internet Relay Chat packet.

8. A non-transitory, machine readable storage medium having stored thereon instructions for performing a method, comprising machine executable code which when executed by at least one machine, causes the machine to:
   generate a packet by an application executed by a processor of a first seat device of an in-flight entertainment system having a plurality of seat devices on an aircraft;
   drop the packet by the seat device when the application is not authorized for Internet communication;
   drop the packet by the seat device when the packet is one of a broadcast packet, multicast packet or destined to a second seat device of the in-flight entertainment system;
   determine that the seat device Internet traffic is below a threshold value; and
   transmit the packet to a network device when the application is authorized, and the packet is not a broadcast packet, multicast packet or destined for the second seat device.

9. The storage medium of claim 8, wherein the seat device drops the packet, when the packet is a network connection attempt.

10. The storage medium of claim 8, wherein the seat device drops the packet when the seat device has reached the threshold value.

11. The storage medium claim 8, wherein the network device drops the packet when another threshold value controlling throughput for the plurality of seat devices is reached.

12. The storage medium claim 8, wherein the seat device drops the packet when the packet is for a non-authorized uniform resource locator (URL).

13. The storage medium claim 8, wherein the seat device drops the packet, when the packet is destined to a private Internet Protocol address.

14. The storage medium claim 8, wherein the server transmits any Internet Control Message Protocol packet generated by the first seat device.

* * * * *